(12) United States Patent
Ameri et al.

(10) Patent No.: US 11,181,404 B2
(45) Date of Patent: Nov. 23, 2021

(54) MAGNETIC FLOWMETER WITH A CURRENT SAMPLING CIRCUIT SAMPLING COIL CURRENT PULSES AT A SAMPLING FREQUENCY

(71) Applicant: Micro Motion, Inc., Boulder, CO (US)

(72) Inventors: Masoud Ameri, Maple Plain, MN (US); Scot Ronald Foss, Eden Prairie, MN (US); Jared James Dreier, Chaska, MN (US)

(73) Assignee: MICRO MOTION, INC., Boulder, CO (US)

( * ) Notice: Subject to any disclaimer, the term of this patent is extended or adjusted under 35 U.S.C. 154(b) by 165 days.

(21) Appl. No.: 16/587,886

(22) Filed: Sep. 30, 2019

(65) Prior Publication Data

US 2021/0072053 A1 Mar. 11, 2021

Related U.S. Application Data

(60) Provisional application No. 62/896,124, filed on Sep. 5, 2019.

(51) Int. Cl.
  *G01F 1/58* (2006.01)
  *G01F 1/60* (2006.01)

(52) U.S. Cl.
  CPC .............. *G01F 1/586* (2013.01); *G01F 1/584* (2013.01); *G01F 1/60* (2013.01)

(58) Field of Classification Search
  None
  See application file for complete search history.

(56) References Cited

U.S. PATENT DOCUMENTS 4,167,871 A  9/1979 Shauger et al.
4,193,298 A  3/1980 Kayama et al.
(Continued)

FOREIGN PATENT DOCUMENTS

CA   2 306 666   3/1991
CN   1170125    10/2004
(Continued)

OTHER PUBLICATIONS

Office Action from Chinese Patent Application No. 202020151175.3, dated Jul. 7, 2020.
(Continued)

*Primary Examiner* — Harshad R Patel
(74) *Attorney, Agent, or Firm* — Westman, Champlin & Koehler, P.A.

(57) ABSTRACT

A magnetic flowmeter includes a flow tube assembly, an electromotive force (EMF) sensor, a power amplifier, a current sampling circuit, and a controller. The flow tube assembly receives the fluid flow, and includes a coil configured to receive a coil current and induce an EMF in the fluid flow that is proportional to the flow rate. The EMF sensor generates an output indicating the induced EMF. The power amplifier is configured to generate unfiltered current pulses at a first frequency. The power amplifier includes a low pass filter that attenuates the unfiltered current pulses to form coil current pulses at a second frequency that form the coil current. The current sampling circuit samples the coil current pulses at a sampling frequency. The controller is configured to change a relationship between the sampling frequency and the first frequency, and adjust the coil current based on the samples.

20 Claims, 11 Drawing Sheets

(56) References Cited

U.S. PATENT DOCUMENTS

| | | | |
|---|---|---|---|
| 4,229,703 A | 10/1980 | Bustin | |
| 4,784,000 A | 11/1988 | Gaertner | |
| 5,325,728 A | 7/1994 | Zimmerman et al. | |
| 5,372,045 A | 12/1994 | Schulz et al. | |
| 5,530,639 A | 6/1996 | Schulz et al. | |
| 5,639,970 A * | 6/1997 | Schulz | G01F 1/60 |
| | | | 363/17 |
| 5,874,818 A | 2/1999 | Schuurman | |
| 5,905,206 A | 5/1999 | Herwig et al. | |
| 6,269,701 B1 | 8/2001 | Keech | |
| 6,644,127 B1 | 11/2003 | Matzen | |
| 6,697,742 B1 | 2/2004 | Franklin et al. | |
| 6,763,729 B1 | 7/2004 | Matzen | |
| 7,688,057 B2 | 3/2010 | Foss et al. | |
| 7,779,702 B2 | 8/2010 | Shanahan | |
| 7,921,733 B2 | 4/2011 | Foss et al. | |
| 9,163,968 B2 | 10/2015 | Foss et al. | |
| 9,175,993 B2 | 11/2015 | Hunter et al. | |
| 9,182,258 B2 | 11/2015 | Rovner | |
| 9,228,869 B2 | 1/2016 | Hunter et al. | |
| 9,395,221 B2 | 7/2016 | Foss et al. | |
| 9,696,188 B2 | 7/2017 | Rogers et al. | |
| 9,952,075 B2 | 4/2018 | Foss et al. | |
| 10,075,246 B2 | 9/2018 | Hunter et al. | |
| 10,663,331 B2 * | 5/2020 | Foss | G01F 1/60 |
| 2006/0081067 A1 | 4/2006 | Budmiger | |
| 2010/0107776 A1 | 5/2010 | Shanahan | |
| 2013/0333484 A1 | 12/2013 | Henry et al. | |
| 2015/0082906 A1 | 3/2015 | Foss et al. | |
| 2015/0082909 A1 | 3/2015 | Foss et al. | |
| 2015/0177035 A1 | 6/2015 | Rovner et al. | |
| 2017/0115146 A1 | 4/2017 | Shi | |

FOREIGN PATENT DOCUMENTS

| | | |
|---|---|---|
| CN | 107478279 | 12/2017 |
| CN | 107560676 | 1/2018 |
| DE | 10 2004 046 238 | 3/2006 |
| EP | 1 260 797 | 11/2002 |
| EP | 2 167 922 | 4/2019 |
| FR | 2 521 289 | 8/1983 |
| GB | 2 348 964 | 4/2000 |
| JP | 3-122523 | 5/1991 |
| RU | 2 584 384 | 5/2016 |
| RU | 2 645 834 | 2/2018 |
| WO | WO 2009/008974 | 1/2009 |
| WO | WO 2009/154112 | 12/2009 |
| WO | WO 2018/215034 | 11/2018 |

OTHER PUBLICATIONS

International Search Report and Written Opinion of the International Searching Authority from International Application No. PCT/US2020/024656, dated Jul. 8, 2020.

International Search Report and Written Opinion of the International Searching Authority from International Application No. PCT/US2020/047775, dated Nov. 19, 2020.

International Search Report and Written Opinion of the International Searching Authority from International Application No. PCT/US2020/047432, dated Nov. 25, 2020.

International Search Report and Written Opinion of the International Searching Authority from International Application No. PCT/US2020/047609, dated Dec. 16, 2020.

Office Action from U.S. Appl. No. 16/587,615, dated May 5, 2021.
Office Action from U.S. Appl. No. 16/588,012, dated May 28, 2021.

* cited by examiner

MAGNETIC FLOWMETER WITH A CURRENT SAMPLING CIRCUIT SAMPLING COIL CURRENT PULSES AT A SAMPLING FREQUENCY

CROSS-REFERENCE TO RELATED APPLICATION

The present application is based on and claims the benefit of U.S. provisional patent application No. 62/896,124, filed Sep. 5, 2019, the content of which is hereby incorporated by reference in its entirety.

FIELD

Embodiments of the present disclosure relate to magnetic flowmeters and, more specifically, to techniques for controlling the magnetic field used in flow rate measurements.

BACKGROUND

Precise and accurate flow control is critical to a wide range of fluid processing applications, including bulk fluid handling, food and beverage preparation, chemistry and pharmaceuticals, water and air distribution, hydrocarbon extraction and processing, environmental control, and a range of manufacturing techniques utilizing thermoplastics, thin films, glues, resins and other fluid materials, for example. Flow rate measurement technologies used in each particular application depend upon the fluids involved, and on the relevant process pressures, temperatures and flow rates.

Exemplary flow rate measuring technologies include turbine devices that measure flow as a function of mechanical rotation, pitot sensors and differential pressure devices that measure flow as a function of the Bernoulli effect or pressure drop across a flow restriction, vortex and Coriolis devices that measure flow as a function of vibrational effects, and mass flowmeters that measure flow as a function of thermal conductivity. Magnetic flowmeters are distinguished from these technologies by characterizing a flow based on Faraday's Law, which depends upon electromagnetic interactions rather than mechanical or thermodynamic effects. In particular, magnetic flowmeters rely upon the conductivity of the process fluid, and the electromotive force (EMF) induced as the fluid flows through a region of magnetic field.

Conventional magnetic flowmeters include a sensor section and a transmitter section. The transmitter section includes a current generator that drives a current through a coil of the sensor section to generate a magnetic field across the pipe section. The magnetic field induces the EMF or potential difference (voltage) across the flow that is proportional to the velocity of the flow. The magnetic flowmeter measures the flow rate based on the voltage difference, which is detected by the sensor section.

The accuracy of the flow rate measurement depends on many factors, one of which is the accurate generation of the magnetic field across the flow. An operating setpoint directs the current generator to generate the current that will produce a desired magnetic field across the flow. The current may be periodically sampled to ensure that it matches the operating setpoint.

The current generator current may be transmitted from the current generator through a transmission line to the coil of the sensor section. Under some circumstances, such as when the transmission line is long (e.g., 10-1000 feet), for example, a mismatch may occur between the transmission line characteristic impedance and the current generator and/or the sensor section. Such an impedance mismatch can result in voltage/current wave reflections at the mismatched impedances that may produce standing current/voltage waves in the transmission line.

Such standing waves may adversely affect the accuracy of the current generator current samples. Thus, the sampled current generator current may not match the actual current generator current being supplied to the coil of the sensor section. As a result, the current generator current and the corresponding magnetic field may not meet the desired operational parameters of the magnetic flowmeter for accurate flow rate measurements.

SUMMARY

Embodiments of the present disclosure are directed to magnetic flowmeters for measuring a flow rate of a fluid flow, and methods of controlling magnetic flowmeters. In one embodiment, the magnetic flow meter includes a flow tube assembly, an electromotive force (EMF) sensor, a power amplifier, a current sampling circuit, and a controller. The flow tube assembly includes a pipe section configured to receive the fluid flow, and a coil configured to receive a coil current and produce a magnetic field across the fluid flow that induces an EMF in the fluid flow that is proportional to the flow rate. The EMF sensor is arranged to sense the EMF and generate an output indicating the induced EMF. The power amplifier is configured to generate unfiltered current pulses at a first frequency. The power amplifier includes a low pass filter that attenuates the unfiltered current pulses to form coil current pulses at a second frequency that form the coil current. The current sampling circuit is configured to capture a series of samples of the coil current pulses at a sampling frequency. The controller is configured to change a relationship between the sampling frequency and the first frequency, and adjust the coil current based on the samples.

Another embodiment of the magnetic flowmeter includes a flow tube assembly, an EMF sensor, a power amplifier, a current sampling circuit, and a controller. The flow tube assembly includes a pipe section configured to receive the fluid flow, and a coil configured to receive a coil current and produce a magnetic field across the fluid flow that induces an EMF in the fluid flow that is proportional to the flow rate. The EMF sensor is arranged to sense the EMF and generate an output indicating the induced EMF. The power amplifier is configured to generate unfiltered current pulses at a first frequency. Each of the unfiltered current pulses is generated within a pulse period after a pulse delay from the beginning of the pulse period. The power amplifier includes a low pass filter that attenuates the unfiltered current pulses to form coil current pulses at a second frequency that form the coil current. The current sampling circuit is configured to capture a series of samples of the coil current pulses at a sampling frequency. The controller is configured to adjust the pulse delay to change a relationship between the sampling frequency and the unfiltered current pulses, and adjust the coil current based on the samples.

In one embodiment of the method, a fluid flow is received through a pipe section of a flow tube assembly. Unfiltered current pulses are generated at a first frequency using a power amplifier. Each of the unfiltered current pulses is generated within a pulse period corresponding to the first frequency. The unfiltered current pulses are attenuated using a low pass filter of the power amplifier to form coil current pulses at a second frequency that form a coil current. The coil current pulses include remnant signals of the unfiltered current pulses. The coil current pulses are driven through a coil of the flow tube assembly in alternating directions. A magnetic field is generated across the fluid flow that induces an EMF in the fluid flow that is proportional to the flow rate. One of the coil current pulses is sampled at a sampling point within each pulse period using a current sampling circuit. A relationship between the sampling points and the remnant signals of the unfiltered current pulses is unique for each sampling point. The coil current is adjusted based on the current pulse samples using a controller.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
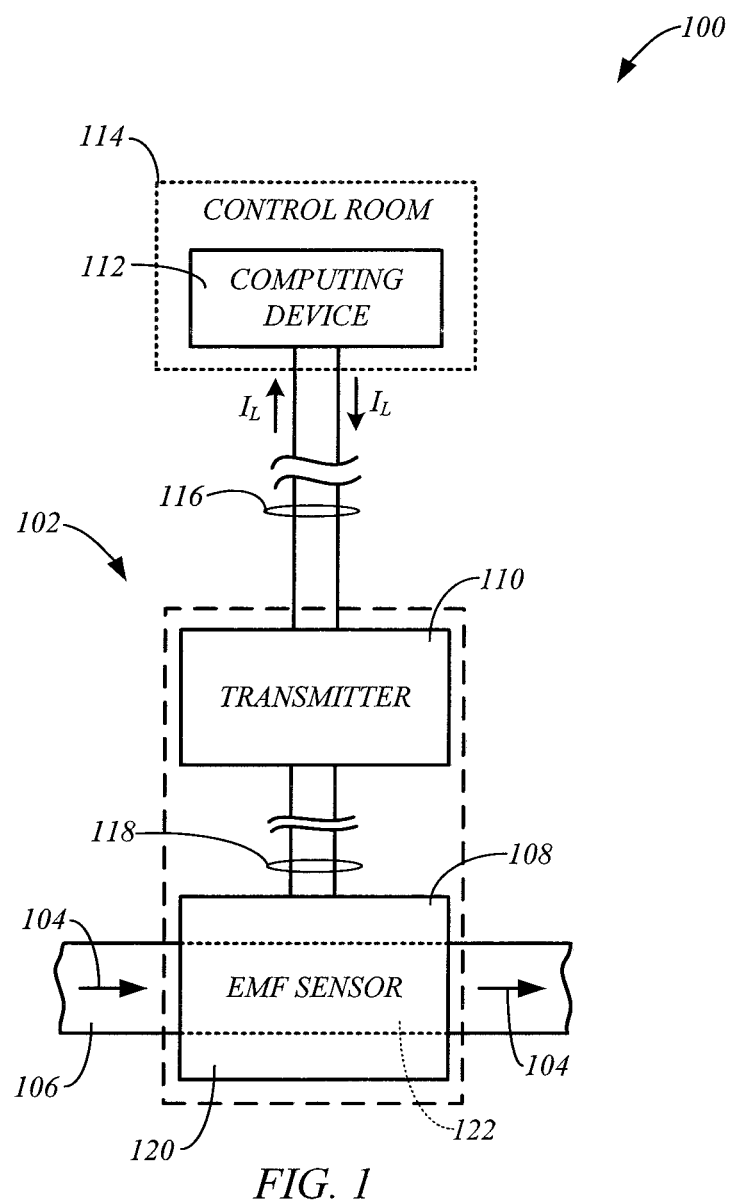
FIG. 1 is a simplified diagram of an exemplary industrial process measurement system, in accordance with embodiments of the present disclosure

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or shown in block diagram form, in order to avoid obscuring the embodiments in unnecessary detail.

FIG. 1 is a simplified diagram of an exemplary industrial process measurement system 100, in accordance with embodiments of the present disclosure. The system 100 may be used in the processing of a material (e.g., process medium) to transform the material from a less valuable state into more valuable and useful products, such as petroleum, chemicals, paper, food, etc. For example, the system 100 may be used in an oil refinery that performs industrial processes that can process crude oil into gasoline, fuel oil, and other petrochemicals.

The system 100 includes a pulsed direct current (DC) magnetic flowmeter 102 that is configured to sense a flow rate of a process fluid flow 104, such as through a pipe 106, for example. The magnetic flowmeter 102 includes an electromotive force (EMF) sensor section 108 and a transmitter 110. The sensor section 108 is generally configured to measure or sense the flow rate of the fluid flow 104. The transmitter 110 is generally configured to control the sensor to measure the flow rate, and optionally communicate the measured flow rate to an external computing device 112, such as a computerized control unit, which may be remotely located from the flowmeter 102, such as in a control room 114 of the system 100.

The transmitter 110 may communicate with the external computing device 112 over a suitable process control loop. In some embodiments, the process control loop includes a physical communication link, such as a two-wire control loop 116, or a wireless communication link. Communications between the external computing device 112, and the transmitter section may be performed over the control loop 116 in accordance with conventional analog and/or digital communication protocols. In some embodiments, the two-wire control loop 116 includes a 4-20 milliamp control loop, in which a process variable may be represented by a level of a loop current $I_L$ flowing through the two-wire control loop 116. Exemplary digital communication protocols include the modulation of digital signals onto the analog current level of the two-wire control loop 116, such as in accordance with the HART® communication standard. Other purely digital techniques may also be employed including Foundation Fieldbus and Profibus communication protocols. Exemplary wireless versions of the process control loop include, for example, a wireless mesh network protocol, such as WirelessHART® (IEC 62591) or ISA 100.11a (IEC 62734), or another wireless communication protocol, such as WiFi, LoRa, Sigfox, BLE, or any other suitable protocol.

Power may be supplied to the magnetic flowmeter 102 from any suitable power source. For example, the magnetic flowmeter 102 may be wholly powered by the loop current $I_L$ flowing through the control loop 116. One or more power supplies may also be utilized to power the process magnetic flowmeter 102, such as an internal or an external battery. An electrical power generator (e.g., solar panel, a wind power generator, etc.) may also be used to power the magnetic flowmeter 102, or charge a power supply used by the magnetic flowmeter 102.

The transmitter 110 may be directly attached to the sensor section 108, such as a housing containing the sensor section 108, or located remotely (e.g., 10-1000 feet) from the sensor section 108. When the transmitter 110 is remotely located from the sensor section 108, electrical connections between the transmitter 110 and sensor section 108 may be provided by one or more connecting cables or transmission lines 118, which may be formed by cables, wires, a data bus, a control bus, or other suitable connection for electrical and data communication.

Figure 2:
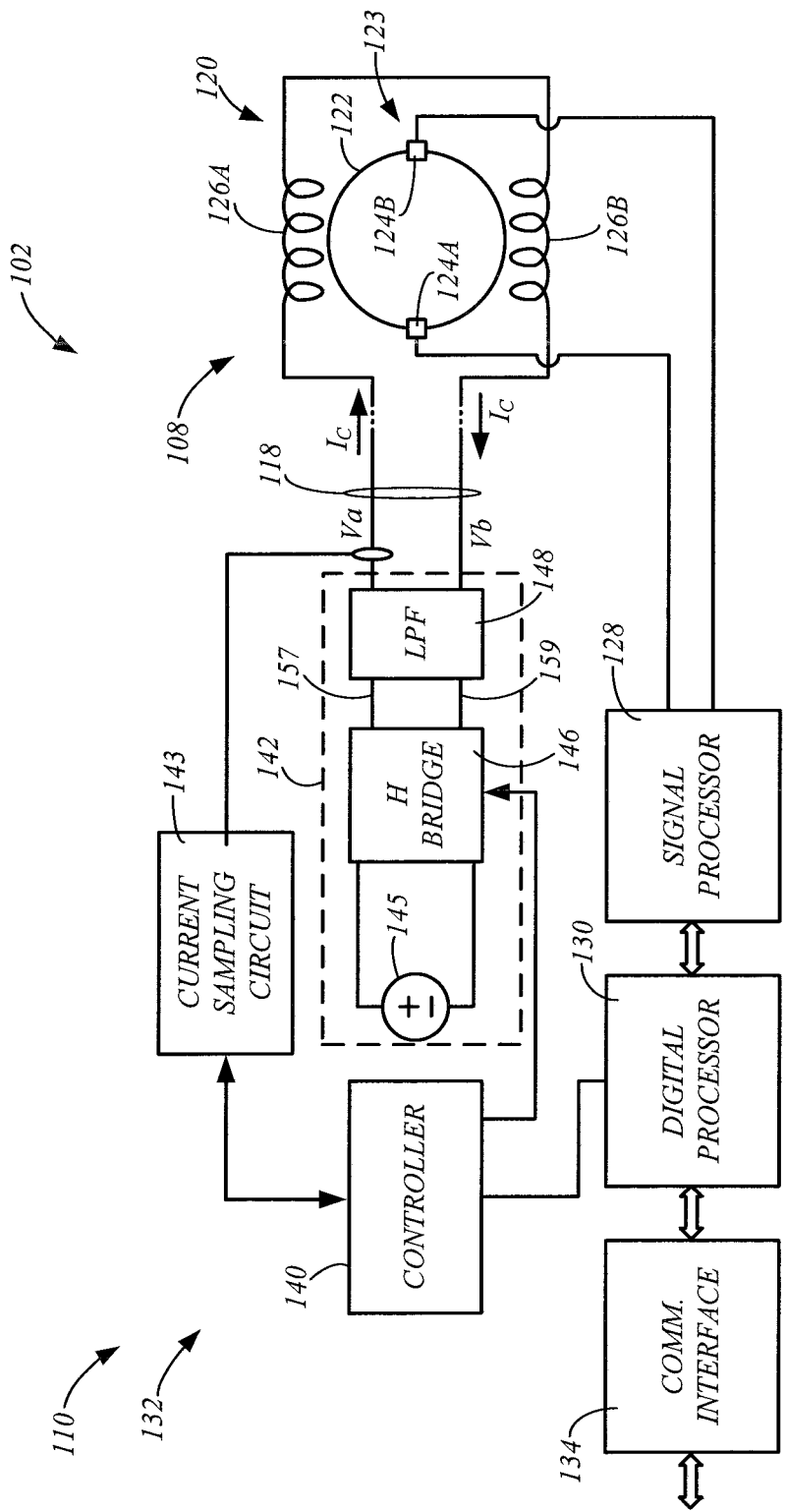
FIG. 2 is a simplified diagram of an exemplary magnetic flowmeter, in accordance with embodiments of the present disclosure.

FIG. 2 is a simplified diagram of the magnetic flowmeter 102, in accordance with embodiments of the present disclosure. The sensor section 108 may include a flow tube assembly 120 having a pipe section 122, through which the fluid flow 104 travels, as shown in FIG. 1. The flow tube assembly 120 also includes an EMF sensor 123 having electrodes 124, such as electrodes 124A and 124B, and the flow tube assembly 120 includes one or more field coils or coil wires 126, such as coils 126A and/or 126B. The electrodes 124A and 124B, and the coils 126A and 126B may be positioned on opposing sides of the pipe section 122, as shown in FIG. 2.

The digital processor 130 may represent one or more processors that control components of the magnetic flowmeter 102 to perform one or more functions described herein in response to the execution of instructions, which may be stored in non-transitory, patent eligible memory. In some embodiments, the digital processor 130 provides control signals to the current generator 132 based on an operating setpoint of the magnetic flowmeter 102, to generate a coil current $I_C$ comprising DC square wave current pulses that alternate direction through the coils 126.

In some embodiments, the current generator 132 includes a controller 140, a power amplifier 142, and a profile generator 144. The controller 140 may represent one or more processors that control components of the power amplifier 142 to perform one or more functions described herein, such as in response to control signals from the digital processor 130, and/or in response to the execution of instructions, which may be stored in non-transitory, patent eligible memory represented by the controller 140.

The controller 140 may periodically receive current level measurements of the coil current $I_C$ from a current sampling circuit 143 as feedback to determine if an adjustment to the coil current $I_C$ is required to match the setpoint level for the magnetic flowmeter 102, which is necessary for accurate flow rate measurements. The current sampling circuit 143 may take on any suitable form. For example, the current sampling circuit 143 may operate to sense a voltage that is related to the coil current $I_C$, such as at the location shown in FIG. 2, and convert the sampled voltage to a digital signal using an analog-to-digital converter that is presented to the controller 140 as a measured current level, for example. The controller 140 may adjust the coil current $I_C$ based on the measured current level in an attempt to match the current level of the coil current $I_C$ to the setpoint current level directed by the operating setpoint of the magnetic flowmeter 102. The sampled voltage over time may also be used to form the charts of the current profile of the coil current $I_C$ or coil current pulses described herein.

Figure 3:
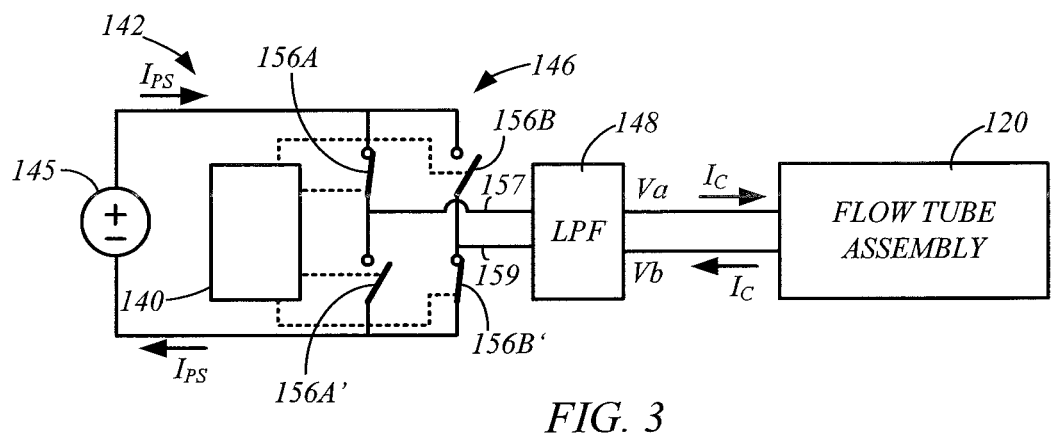
FIGS. 3 and 4 are simplified diagrams of an exemplary programmable bi-directional current generator, in accordance with embodiments of the present disclosure.
Figure 4:
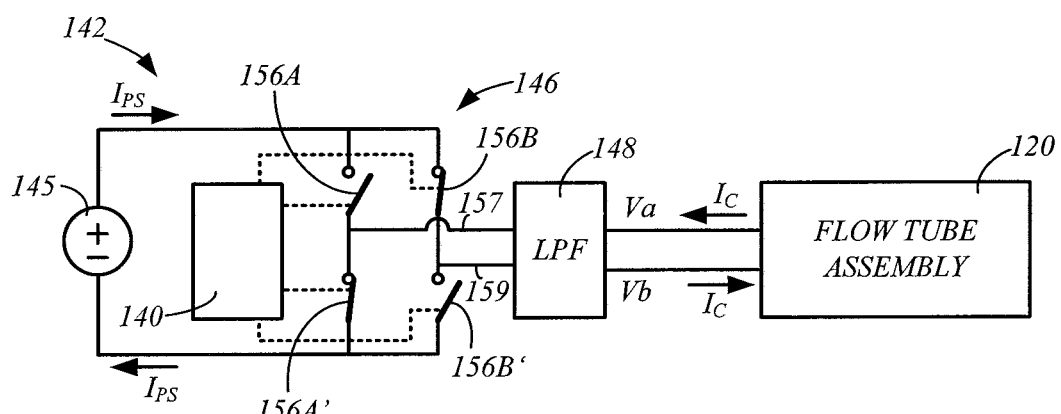

FIGS. 3 and 4 are simplified diagrams of an exemplary power amplifier 142, in accordance with embodiments of the present disclosure. The power amplifier 142 may be in the form of a voltage controlled current source, or another suitable current source. In the illustrated example, the power amplifier 142 includes a power supply 145, an H bridge 146 and a low pass filter (LPF) 148. The H bridge is configured to receive an unfiltered current $I_{PS}$ from the power supply 145 (e.g., voltage source) that travels in the direction indicated in FIGS. 3 and 4. In some embodiments, the H bridge 146 comprises pairs of complementary switches 156 including a switch 156A and its complementary switch 156A', and a switch 156B and its complementary switch 156B'. The complementary nature of the switch pairs 156A and 156A', means that when switch 156A is open, switch 156A' is closed, and when switch 156A is closed, switch 156A' is open. This also applies to the complementary switches 156B and 156B'.

The controller 140 may include a microprocessor and gate driver that controls the switch pairs 156A and 156A' and 156B and 156B' to generate high frequency (e.g., 10-100 kHz) current pulses from the current $I_{PS}$, which are delivered to the LPF 148 over conductors 157 or 159. The low pass filter (LPF) 148 operates to attenuate the high frequency current pulses from the H bridge 146 output on conductors 157 or 159, to form the low frequency (e.g., 5-200 Hz) coil current pulses that form the coil current $I_C$.

Figure 5:
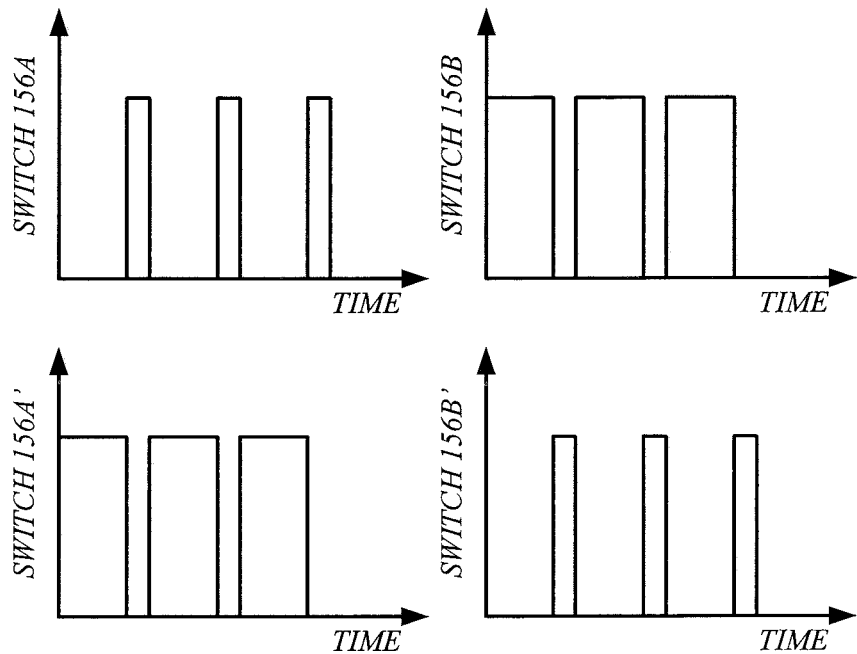
FIGS. 5 and 6 are charts illustrating exemplary control signals from a controller to pairs of complementary switches of an H bridge, in accordance with embodiments of the present disclosure.
Figure 6:
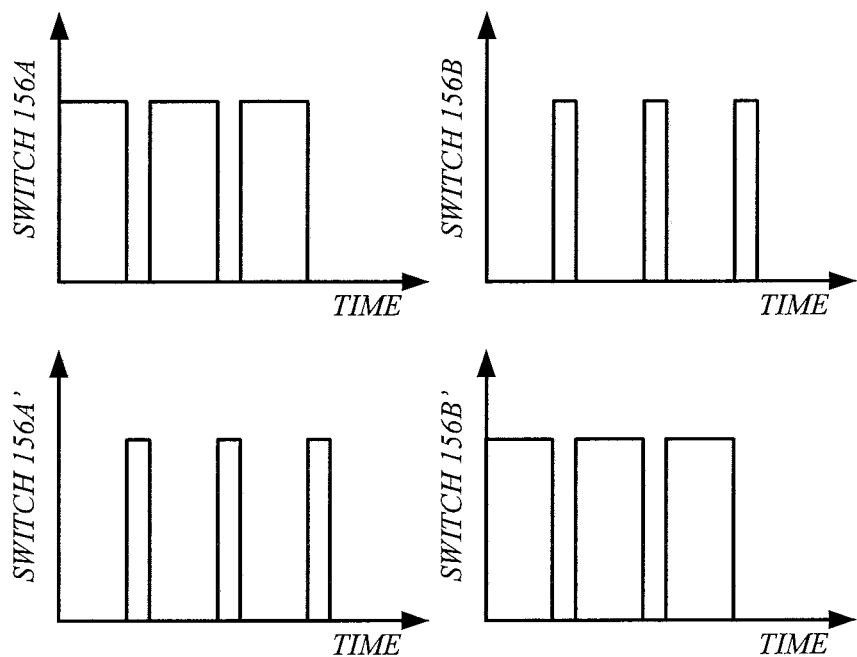

The controller 140 controls the direction the filtered coil current $I_C$ flows through the coils 126 by modulating a duty cycle of the switches 156. For example, FIGS. 5 and 6 are charts illustrating exemplary control signals from the controller 140 to the switches 156 that cause the coil current $I_C$ to flow in the direction indicated in FIGS. 4 and 3, respectively. A high signal in the charts corresponds to a closed state for the switches 156, and a low signal in the charts corresponds to an open state. As indicated in FIG. 5, the duty cycle for the switch 156A is less than the duty cycle for the switch 156B. As a result, the duty cycle for the switch 156A' is greater than the duty cycle for the switch 156B'. This causes the average voltage in the line 159 to be greater than the average voltage in line 157, resulting in the coil current $I_C$ flowing in the direction indicated in FIG. 4. In FIG. 6, the duty cycle for the switch 156A is greater than the duty cycle for the switch 156B, and the duty cycle for the switch 156A' is less than the duty cycle for the switch 156B'. This causes the average voltage in the line 157 to be greater than the average voltage in line 159, resulting in the coil current $I_C$ flowing in the direction indicated in FIG. 3. This configuration is distinct from conventional power amplifiers of magnetic flowmeters 102 that use an H bridge to simply route a current from a power supply in alternating directions through coils of a flow tube assembly.

Figure 7A:
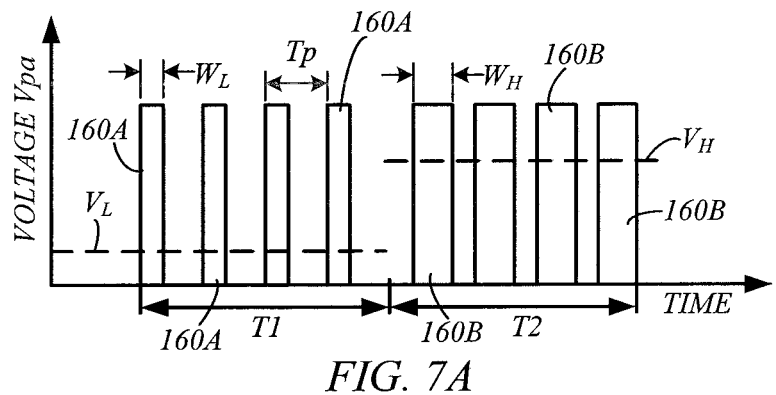
FIGS. 7A and 7B are voltage charts respectively illustrating exemplary high frequency unfiltered current pulses, and the corresponding coil current pulses, in accordance with embodiments of the present disclosure.
Figure 7B:
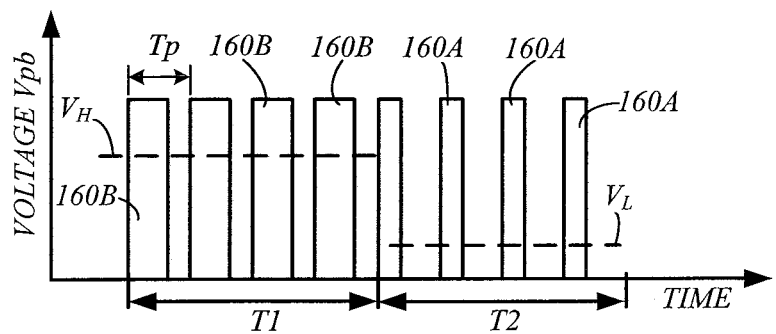

FIGS. 7A and 7B are voltage charts illustrating exemplary high frequency current pulses 160, such as pulses 160A and 160B, output from the H bridge 146 on line 157 having a voltage Vpa (FIG. 7A) and on line 159 having a voltage Vpb (FIG. 7B) prior to the LPF 148, in accordance with embodiments of the present disclosure. For example, a series of voltage pulses 160A having a period of Tp, and a corresponding frequency of 1/Tp (e.g., 10-100 kHz) on the line 157 from the H bridge 146 during the pulse or excitation period T1 may each have a pulse width $W_L$, as shown in FIG. 7A. Over the course of the pulse period T1, at which the coil current $I_C$ changes direction, the pulses 160A have average voltage $V_L$. Likewise, a series of high frequency voltage pulses 160B on line 157 from the H bridge 146 during the pulse period T2 may each have a pulse width $W_H$, as shown in FIG. 7B. Over the course of the period T2, the average voltage pulses 160B have an average voltage $V_H$. Line 159 from the H bridge 146 has pulses 160B during the pulse period T1, and 160A during the pulse period T2, which are complementary to those on line 157 during the same periods, as indicated in FIG. 7B.

Figure 7C:
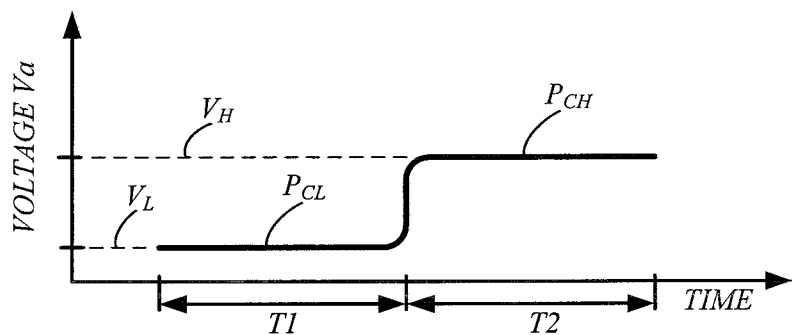
FIGS. 7C and 7D are voltage charts illustrating resulting line voltages after filtering the unfiltered current pulses of FIGS. 7A and 7B.
Figure 7D:
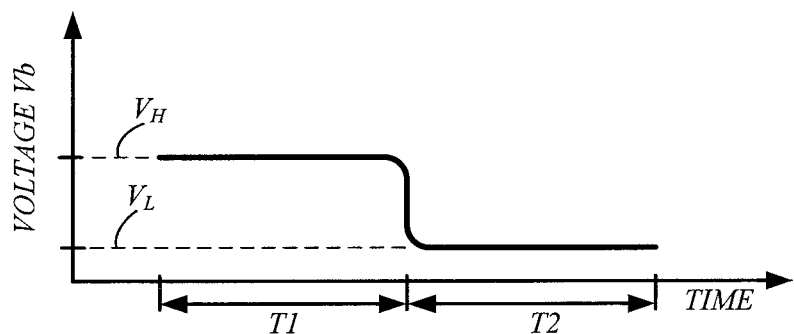

FIGS. 7C and 7D illustrate the voltages Va and Vb (FIGS. 2, 3 and 4) after the LPF 148, which attenuates the high frequency pulses 136A and 136B on lines 157 and 159. The voltages Va and Vb determined the direction and magnitude of the coil current pulses that form the coil current $I_C$. For example, during the pulse period T1, the voltage Va is less than the voltage Vb. This causes the coil current $I_C$ to flow in the direction indicated in FIG. 4. During the period T2, the voltage Va is greater than the voltage Vb, thus causing the coil current $I_C$ to flow in the direction indicated in FIGS. 2 and 3.

Figure 7E:
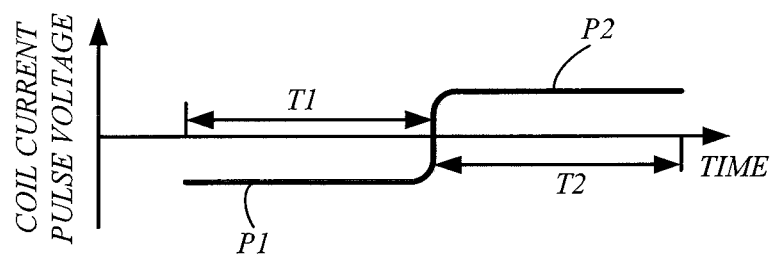
FIG. 7E is a chart of coil current pulses generated in response to the line voltages of FIGS. 7C and 7C.

FIG. 7E is a voltage chart illustrating the coil current pulse voltage over the periods T1 and T2, such as the voltage sampled by the current sampling circuit 143. As shown in FIG. 7E, the voltage of the coil current pulse P1 over the period T1 is negative, and the voltage of the coil current pulse P2 is positive over the period T2.

The coil current $I_C$ is delivered to the field coils 126A and 126B of the flow tube 120 through a suitable electrical connection, such as the transmission line 118 shown in FIGS. 1 and 2. This causes the coils 126A and/or 126B to generate a magnetic field across the pipe section 122 that changes direction at the excitation frequency (e.g., 1/T). The process fluid flow 104 traveling through the interior of pipe section 122 functions as a moving conductor that induces EMF in the fluid in accordance with Faraday's law of electromagnetic induction. The electrodes 124A and 124B, which are either capacitively coupled to the conductive process fluid or in direct electrical contact with the process fluid, pick up the voltages present in the fluid flow 104. The difference in the voltages at the electrodes 124A and 124B is proportional to the rate of the fluid flow 104.

The signal processor 128 of the transmitter 110 is connected to the electrodes 124A and 124B. The flow tube assembly 120 may be electrically grounded to the pipe section 122, to a flange or pipe section upstream or downstream of the pipe section 122, or to another suitable ground connection. The digital processor 130 controls the signal processor 128 to sample the voltage difference between the electrodes 124A and 124B, and provide the measured voltage difference to the digital processor 130, using any suitable technique. This may involve converting an analog differential voltage signal to a digital value that is supplied to the digital processor 130, for example. The digital processor 130 may perform further signal processing of measured differential voltage to establish a flow rate measurement of the flow rate of the process fluid flow 104. The measured flow rate may be communicated to the computing device 112 using the communications interface 134, such as through one of the wired or wireless communication protocols discussed above.

Figure 8:
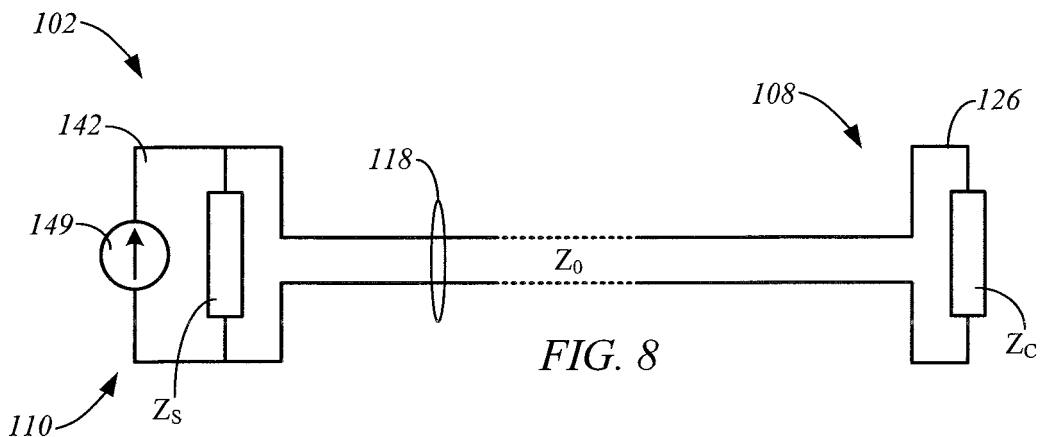
FIG. 8 is a schematic diagram of an exemplary magnetic flowmeter, in accordance with embodiments of the present disclosure.

FIG. 8 is a schematic diagram of the power amplifier 142 of the transmitter 110, the coils 126 of the sensor section 108, and the transmission line 118 connecting the power amplifier 142 to the coils 126. The power amplifier 142 is represented by a current source 149 and an impedance $Z_S$, the one or more coils 126 are represented by an impedance $Z_C$, and the transmission line 118 has a characteristic impedance $Z_0$. When the impedance $Z_S$ of the current generator and/or the impedance $Z_C$ of the coils does not match the characteristic impedance $Z_0$ of the transmission line, reflections of the coil current $I_C$ may occur. Such a mismatch in impedances is most likely to occur when the sensor section 108 is connected to the transmitter 110 through a long transmission line 118 (e.g., 10-1000 feet).

The LPF 148 cannot perfectly attenuate the high frequency or unfiltered pulses 160 (FIGS. 7A and 7B). As a result, remnants of the unfiltered pulses 160 pass through the LPF 148 and are present on top of the coil current pulses P of the coil current $I_C$ (or its harmonics). As a result, the reflections of the coil current $I_C$ that occur with the impedance mismatch discussed above include reflections of the high frequency remnants of the unfiltered pulses 160, which could result in a standing wave of voltage/current wave reflections along the transmission line 118.

Figure 9:
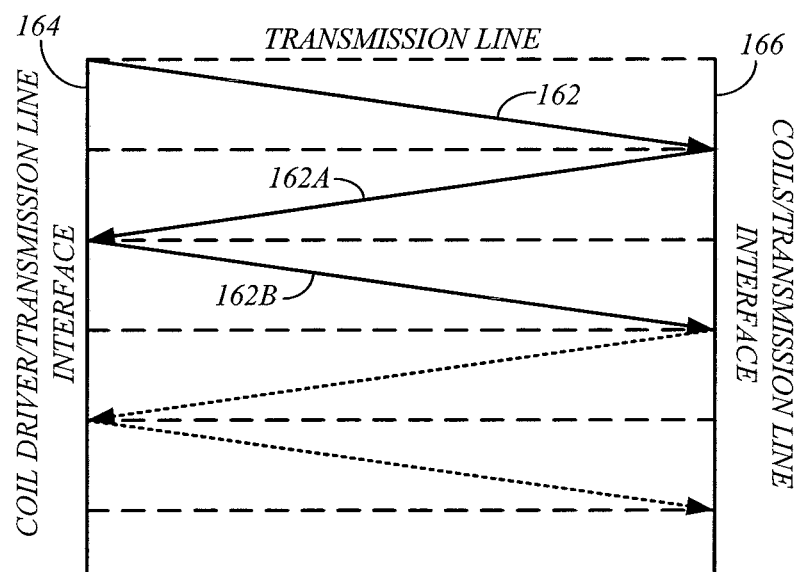
FIG. 9 is a chart illustrating an example of voltage/current wave reflections due to a mismatch between the characteristic impedance of the transmission line and the impedances of the current generator and the coils.
Figure 10:
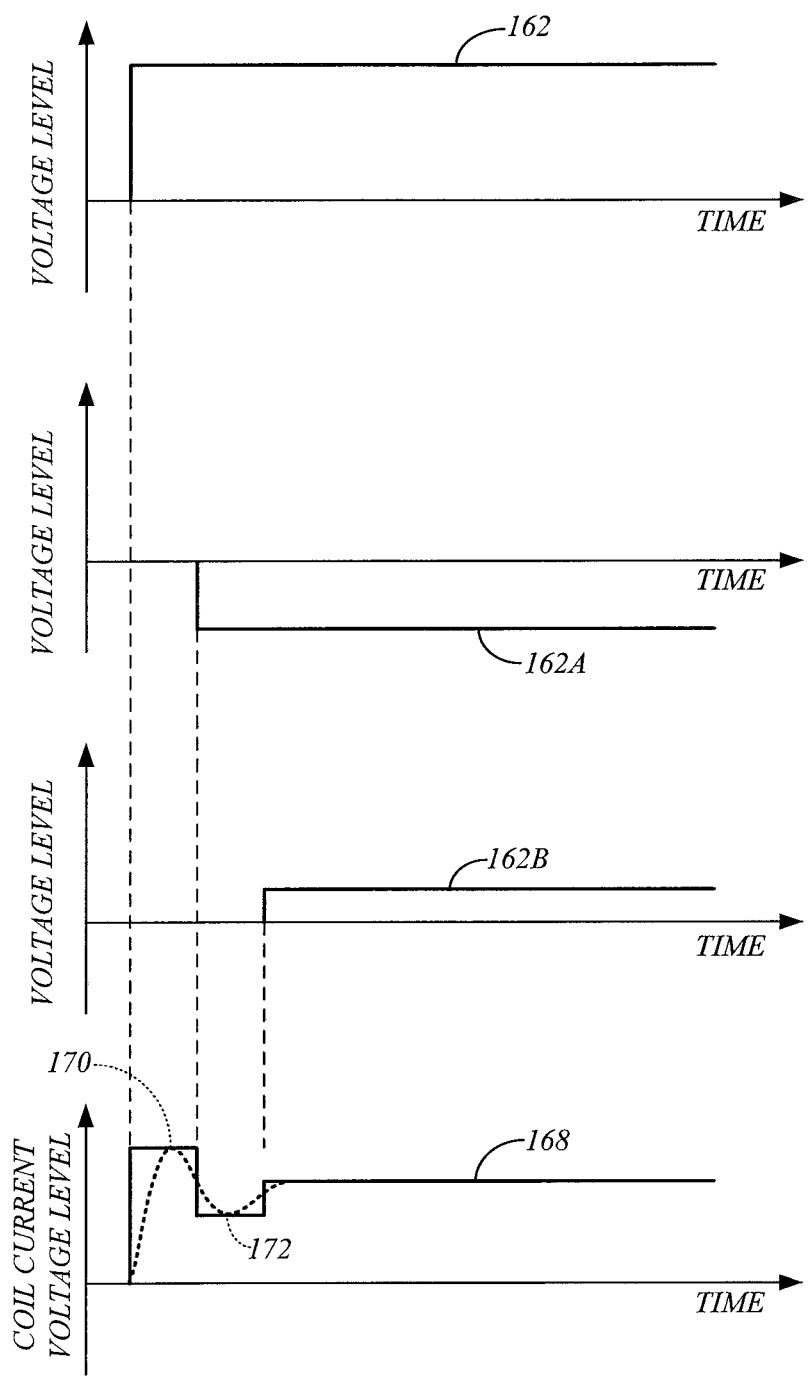
FIG. 10 is a chart illustrating an exemplary standing voltage/current wave that may form due to the mismatched impedances.

FIG. 9 is a chart illustrating an example of voltage/current wave reflections of the remnant signals 162 of the unfiltered pulses 160 on the coil current $I_C$ that were not attenuated by the LPF 148 due to a mismatch between the characteristic impedance $Z_0$ of the transmission line 118 and the impedances $Z_S$ and $Z_C$ of the current generator 132 and the one or more coils 126. FIG. 10 includes charts illustrating a simplified example of the formation of a standing voltage/current wave that may form due to the mismatched impedances.

Figure 11:
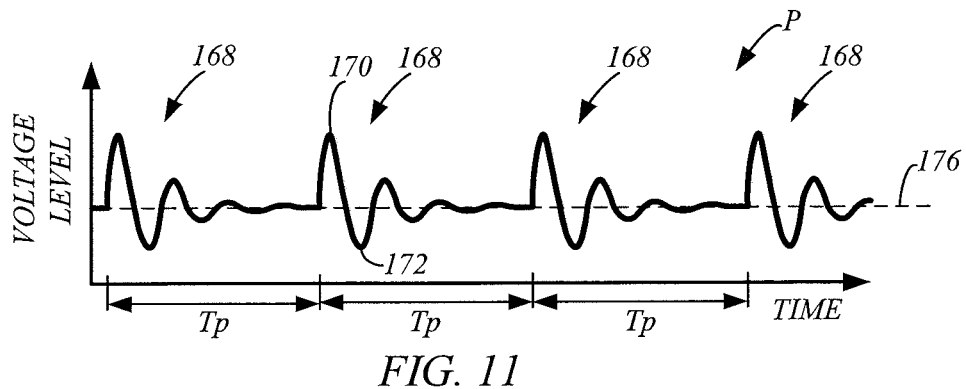
FIG. 11 is a chart illustrating exemplary remnant signals on a coil current pulse, in accordance with embodiments of the present disclosure.
Figure 12:
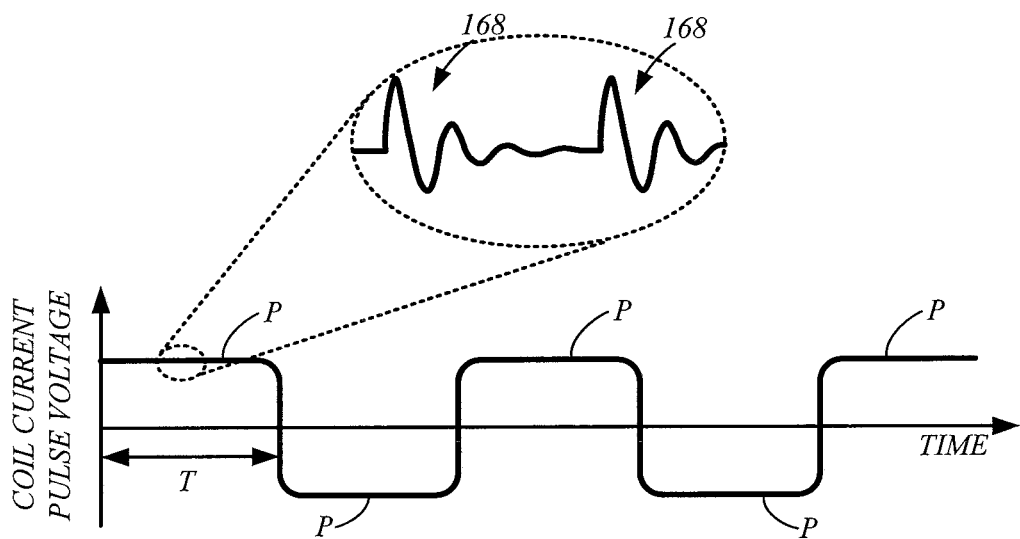
FIG. 12 is a voltage chart illustrating exemplary coil current pulses, in accordance with embodiments of the present disclosure.

As shown in FIG. 9, when the remnant signals 162 are transmitted from the interface 164 of the power amplifier 142 and the transmission line 118 to the coils 126, a portion of the signals 162 is reflected from an interface 166 of the coils 126 and the transmission line 118 back along the transmission line 118 as a reflected voltage signal 162A due to the mismatch between the impedances $Z_0$ and $Z_C$ at the interface 166. Due to the mismatch between the impedances $Z_0$ and $Z_C$ at the interface 164, a portion of the signal 162A is reflected as a voltage signal 162B back along the transmission line 118. The resultant standing wave signal 168 may be observed as "ringing" along the transmission line 118 and includes hills 170 and valleys 172, as shown in FIG. 10. As a result, the coil current $I_C$ may include high frequency voltage signals having a form similar to that of the remnant wave signal 168, as shown in FIG. 11. These remnant wave signals 168 are formed on top of the coil current pulses P, as indicated in the chart of FIG. 12.

In some embodiments, the controller 140 synchronizes the sampling of the coil current $I_C$ with the pulse period Tp or the update cycle of the controller 140 at which the switches 156 of the H bridge are actuated and the pulses 160 are generated. This results in a fixed interval between the remnant wave signals 168 and the sampling point, at which the current sampling circuit 143 samples the coil current $I_C$ pulses P. In the event that standing current/voltage wave reflections occur in the transmission line 118 due to mismatched impedances to form the remnant wave signals 168 on the coil current pulses P, as shown in FIG. 12, the synchronization between the signals 168 and the sampling point can result in the sampling points being at the same locations of the signals 168.

Figure 13:
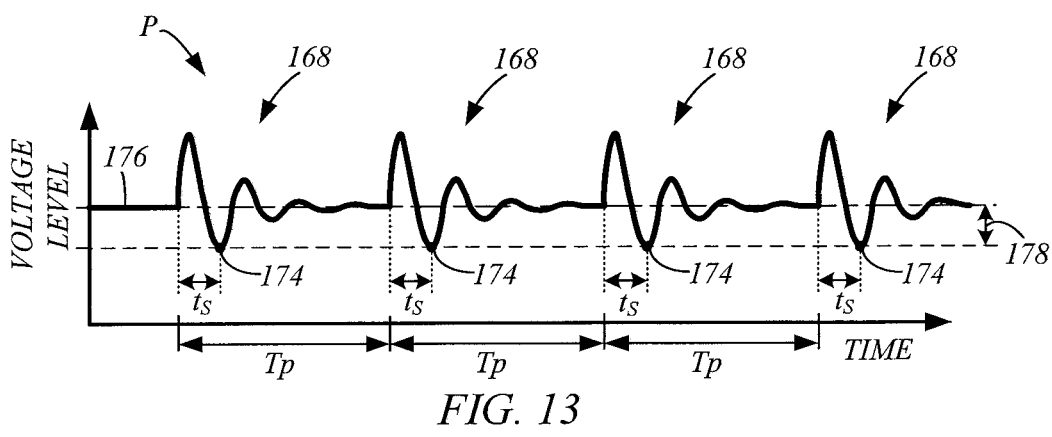
FIG. 13 is a voltage chart illustrating exemplary remnant signals of a coil current and current signal sampling points that are synchronized with the remnant signals, in accordance with embodiments of the present disclosure.

An example of this is illustrated in FIG. 13, in which the current sampling circuit 143 samples the coil current $I_C$ at sampling points 174 at a fixed sampling delay $t_S$ relative to the beginning of each pulse period Tp of each current pulse 160 or remnant wave signal 168. In the illustrated example, the sampling of the coil current pulses P in this manner results in the sampling point 174 being located at a valley of the remnant wave signals 168, but it could also occur at another location along each signal 168, such as at a hill. Thus, each of the sampled coil current levels may deviate from the actual average current level 176 by an offset amount 178.

This error in the measured level of the coil current $I_C$ may cause the controller 140 to set the coil current $I_C$ to a level that is offset from the desired level directed by the digital processor 130 in accordance with the operating setpoint for the magnetic flowmeter 102. As a result, the magnetic field that is generated by the coils 126 in response to the offset coil current will be different from the magnetic field directed by the operating setpoint and required to accurately measure the flow rate of the fluid flow 104. Thus, the measured voltage difference between the electrodes 124A and 124B may not accurately indicate the flow rate of the fluid flow 104.

Embodiments of the present disclosure operate to improve coil current $I_C$ measurements, such as in the presence of standing remnant wave signals 168 due to the impedance mismatch described above, for improved flow rate measurement accuracy. In general, the controller 140 of the current generator 132 is configured to change a relationship (e.g., desynchronize) between the pulses 160 output from the H bridge 146 having a period Tp or a frequency 1/Tp, and the sampling point 174, at which the coil current pulses P are sampled by the sampling circuit 143. As a result, the sampling circuit 143 samples different portions of the signals 168, rather than the same portion (FIG. 13) of the pulses 136 that occurs when the sampling point 174 is synchronized with the period Tp or the frequency 1/Tp.

A plurality of the sampled voltages of each coil current pulse P may be used to establish an average voltage level for the coil current pulse P that more accurately represents the actual level 176 of the coil current $I_C$ that is supplied to the one or more coils 126. As a result, the current generator 132 can more accurately set the coil current pulses P to the voltage level required by the operating setpoint of the magnetic flowmeter 102, thereby providing improved control over the magnetic field generated by the coils 126, and more accurate flow rate measurements.

Figure 14:
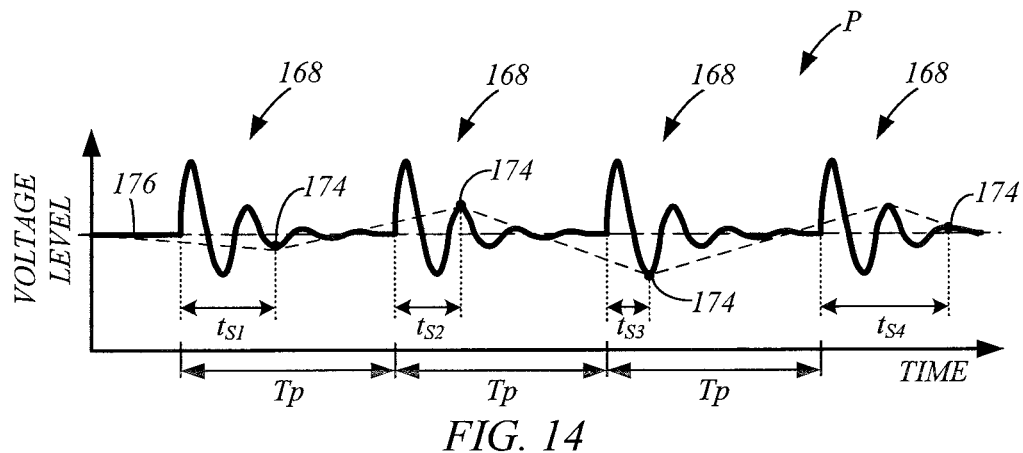
FIGS. 14-16 are voltage charts illustrating exemplary remnant signals on a coil current pulse and current signal sampling points that are desynchronized with the remnant signals, in accordance with embodiments of the present disclosure.
Figure 15:
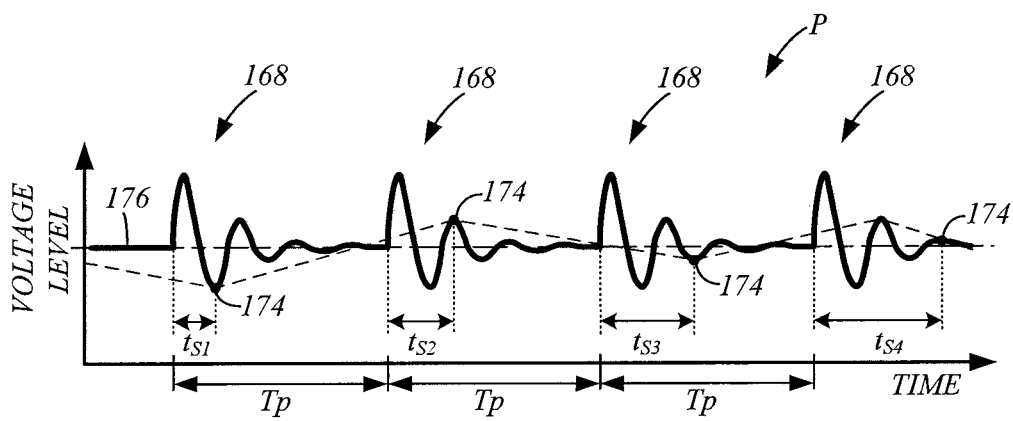
Figure 16:
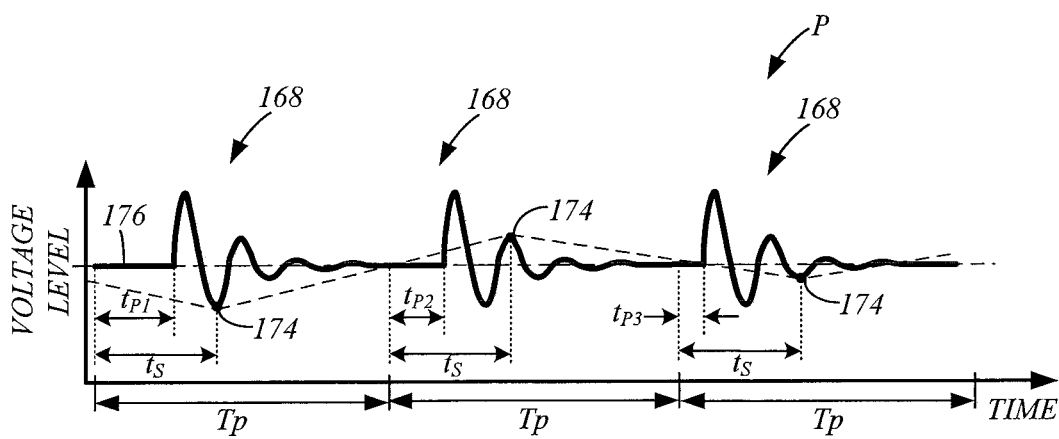

Different techniques for changing the relationship or desynchronizing the sampling points 174 from the remnant signals 168 will be discussed with reference to FIGS. 14-16, which are charts illustrating portions of exemplary coil current pulses P that include remnant signals 168 of the unfiltered current pulses 160. In some embodiments, the relationship between the remnant signals 168 and the sampling points 174 may be changed or desynchronized by introducing a phase shift or delay to the sampling points 174 relative to the remnant signals 168. For example, when the remnant signals 168 are generated at the start of each pulse period Tp and have a pulse frequency (1/Tp), the controller 140 may vary a sampling delay $t_S$ for each sampling point 174 that is measured from the beginning of each pulse period Tp. The sampling delay $t_S$ may be varied from a zero delay to the pulse period Tp. Thus, the coil current pulse P pulse may be sampled at a sampling point 174 that is delayed by a sampling delay $t_{S1}$ from the beginning of a pulse period, a second sampling point 174 may be delayed by a sampling delay $t_{S2}$ from the beginning of the next pulse period Tp, a third sampling point 174 may delayed by a sampling delay $t_{S3}$ from the next pulse period Tp, and a fourth sampling point 174 may be delayed by a sampling delay $t_{S4}$ from the next pulse period Tp, and so on, where the delays $t_{S1}$, $t_{S2}$, $t_{S3}$ and $t_{S4}$, are each different, as indicated in FIGS. 14 and 15. This causes different portions of the remnant signals 168 corresponding to sampling delays $t_{S1}$-$t_{S4}$ to be sampled by the sampling circuit 143 and used by the controller 140 to determine the coil current level measurement. As a result, the repeated sampling of the coil current pulse P in a hill or valley of the remnant pulses 168 is avoided, and the error in the average of the current samples (dashed line) approaches zero over time.

In one embodiment, the controller 140 randomizes the sampling delays $t_S$ over a series of the unfiltered current pulse periods or cycles Tp, as generally shown in FIG. 14. Alternatively, the sampling delay can be programmed such that the sampling points 174 are located at discrete intervals along the pulse periods Tp to effectively perform a controlled sweep over the pulse period Tp of the remnant signals 168, as indicated in FIG. 15. Here, the sampling delays $t_{S1}$-$t_{S4}$ may each be offset by a predetermined period that allows a portion or the entire pulse period T to be sampled by the sampling circuit 143. This may result in a more accurate coil current level measurement, than when the sampling point 174 is randomized.

In accordance with another embodiment, the relationship between the remnant signals 168 or the unfiltered current pulses 160 and the sampling points 174 is desynchronized by introducing a phase shift or pulse delay $t_P$ to the generation of the current pulses 160 from the beginning of the pulse period Tp, while maintaining a fixed sampling frequency by fixing the sampling delay $t_S$ from the beginning of each current pulse period T. An example of this technique is illustrated in the chart of FIG. 16, in which the illustrated remnant signals 168 correspond to unfiltered current pulses 160 that were each generated after a different pulse delay $t_P$, such as $t_{P1}$, $t_{P2}$ and $t_{P3}$, from the onset of the corresponding pulse period Tp, while the sampling delay $t_S$ remains fixed. This causes each of the sample points 174 to correspond to different portions of the current pulses 136 over a series of current pulses 136. As a result, the repeated sampling of the remnant signals 168 within a hill or valley is avoided, and an average of the samples may be obtained over a period of time that more accurately reflects the average level 176 of the coil current $I_C$. Thus, the error in the coil current level measurement approaches zero using this technique.

Figure 17:
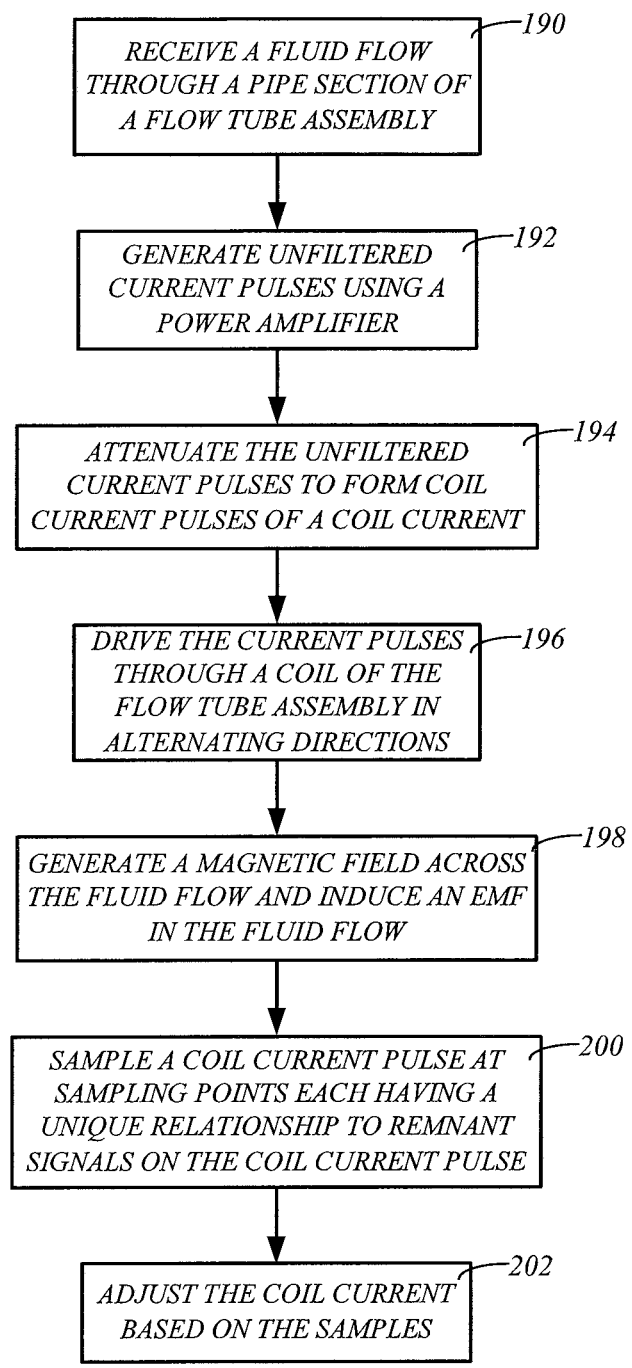
FIG. 17 is a flowchart illustrating a method of controlling a magnetic flowmeter, in accordance with embodiments of the present disclosure.

FIG. 17 is a flowchart illustrating a method of controlling a magnetic flowmeter 102, in accordance with embodiments of the present disclosure. At 190 of the method, a fluid flow 104 is received through the pipe section 122 of the flow tube assembly 120, as shown in FIG. 1. Unfiltered current pulses 160 (FIGS. 7A and 7B) are generated at 192 using the power amplifier 142 of the current generator 132, such as described above. The unfiltered current pulses 160 are generated at a high frequency (e.g., 10-100 kHz) and each pulse 160 is generated within a pulse period Tp (FIGS. 7A and 7B). The unfiltered current pulses 160 are attenuated using the LPF 148 of the power amplifier 142 (FIGS. 3 and 4) to form coil current pulses P (FIGS. 7E and 12) of a coil current $I_C$, at 194. The coil current pulses P include remnant signals 168 of the unfiltered current pulses 160 that were not completely attenuated by the LPF 148, such as shown in FIG. 12.

At 196 of the method, the coil current pulses P are driven through the one or more coils 126 in alternating directions. The formation of positive and negative coil current pulses P (FIG. 7E) that travel through the one or more coils 126 in alternating directions may be generated by the current generator 132 using the techniques described above.

At 198 of the method, a magnetic field is generated across the fluid flow 104 within the pipe section 122 in response to step 186, and an EMF is induced in the fluid flow 104 that is proportional to the flow rate of the fluid flow 104.

One of the coil current pulses P is sampled at a sampling point 147 within each pulse period Tp using the current sampling circuit 143, at 200 of the method. The relationship between the sampling points 174 and the corresponding current pulses are desynchronized in accordance with one of the techniques described above using the controller 140, such that the sampling points 174 have a unique relationship to the remnant signals 168. As a result, the sampling points 174 are not synchronized with the remnant signals 168, such as shown in FIG. 12. Thus, the method avoids the repeated sampling of the remnant signals 168 at the same location, such as at a hill 170 or a valley 172 (FIG. 11) of the remnant signals.

At 202, the coil current $I_C$ is adjusted using the controller 140 based on the samples, such as to match an operating setpoint for the magnetic flowmeter 102. For example, the controller 140 may determine a coil current level measurement, such as a voltage of the coil current pulses P, based on the samples of the coil current pulses P taken by the sampling circuit 143, such as an average of the voltage levels indicated by the samples. Unlike when the sample points 174 are synchronized with the remnant signals 168 (FIG. 13), the captured current samples in accordance with the method cover various portions of the remnant signals 168. The resulting average of the samples provides an approximation of the level of the coil current $I_C$ that is more accurate than when the remnant signals 168 are repeatedly sampled at the same hill or valley of the remnant signals 168. The controller 140 may compare the coil current level measurement to a desired coil current level that is based on the operating setpoint for the magnetic flowmeter 102, and adjust the coil current accordingly in step 202.

Although the embodiments of the present disclosure have been described with reference to preferred embodiments, workers skilled in the art will recognize that changes may be made in form and detail without departing from the spirit and scope of the present disclosure.

What is claimed is:

1. A magnetic flowmeter for measuring a flow rate of a fluid flow, comprising:
   a flow tube assembly including a pipe section configured to receive the fluid flow, and a coil configured to receive a coil current and produce a magnetic field across the fluid flow that induces an electromotive force (EMF) in the fluid flow that is proportional to the flow rate;
   an EMF sensor arranged to sense the EMF and generate an output indicating the induced EMF; and
   a power amplifier spaced apart from the flow tube assembly and connected to the coil by a transmission line configured to generate unfiltered current pulses at a first frequency and including a low pass filter that attenuates the unfiltered current pulses to form coil current pulses at a second frequency that form the coil current, the coil current inducing a standing wave in the transmission line due to an impedance mismatch;
   a current sampling circuit configured to capture a series of samples of the coil current pulses at a sampling frequency; and
   a controller configured to change a relationship between the sampling frequency and the first frequency to reduce measurement errors due to the standing wave, and adjust the coil current based on the samples.

2. The magnetic flowmeter of claim 1, wherein:
   the unfiltered current pulses each have a pulse period corresponding to the first frequency;
   the current sampling circuit samples the coil current pulses at a sampling delay from the beginning of each pulse period; and
   the controller varies the sampling delay to change the relationship between the sampling frequency and the first pulse frequency.

3. The magnetic flowmeter of claim 2, wherein the controller randomizes the sampling delay.

4. The magnetic flowmeter of claim 2, wherein the controller shifts the sampling delay over the series of samples.

5. The magnetic flowmeter of claim 2, wherein:
   the power amplifier comprises:
      a power supply;
      an H bridge coupled to the power supply; and
      the low pass filter configured to receive the unfiltered current pulses from the H bridge; and
   the controller is configured to actuate pairs of complementary switches of the H bridge at varying duty cycles to generate the unfiltered current pulses and alternate the direction of the coil current pulses through the coil.

6. The magnetic flowmeter of claim 5, wherein:
   the first frequency is 10-100 kHz; and
   the second frequency is 5-200 Hz.

7. The magnetic flowmeter of claim 5, wherein:
   the EMF sensor comprises first and second electrodes positioned on opposing sides of the fluid flow, each of the first and second electrodes configured to sense a voltage of the fluid flow; and
   the magnetic flowmeter includes:
      a signal processor configured to receive the voltages sensed by the first and second electrodes and generate a digital voltage signal indicating a voltage difference between the first and second electrodes that is proportional to the EMF and the flow rate of the fluid flow; and
      a digital processor configured to process the digital voltage signal and establish a flow rate of the fluid flow.

8. The magnetic flowmeter of claim 7, including a communications interface configured to communicate the flow rate to an external computing device over a two-wire process control loop that powers the magnetic flowmeter.

9. A magnetic flowmeter for measuring a flow rate of a fluid flow, comprising:
   a flow tube assembly including a pipe section configured to receive the fluid flow, and a coil configured to receive a coil current and produce a magnetic field across the fluid flow that induces an electromotive force (EMF) in the fluid flow that is proportional to the flow rate;
   an EMF sensor arranged to sense the EMF and generate an output indicating the induced EMF; and
   a power amplifier spaced apart from the flow tube assembly and connected to the coil by a transmission line configured to generate unfiltered current pulses at a first frequency and including a low pass filter that attenuates the unfiltered current pulses to form coil current pulses at a second frequency that form the coil current, the coil current inducing a standing wave in the transmission line due to an impedance mismatch, wherein each of the unfiltered current pulses is generated within a pulse period after a pulse delay from the beginning of the pulse period;

a current sampling circuit configured to capture a series of samples of the coil current pulses at a sampling frequency; and a controller configured to adjust the pulse delay to change a relationship between the sampling frequency and the unfiltered current pulses to reduce measurement errors due to the standing wave, and adjust the coil current based on the samples.

10. The magnetic flowmeter of claim 9, wherein the controller randomizes the pulse delay.

11. The magnetic flowmeter of claim 9, wherein the controller shifts the pulse delay for each of the current pulses corresponding to the series of samples.

12. The magnetic flowmeter of claim 9, wherein:
the power amplifier comprises:
a power supply;
an H bridge coupled to the power supply; and
the low pass filter configured to receive the unfiltered current pulses from the H bridge through first and second conductors; and
the controller is configured to actuate pairs of complementary switches of the H bridge at varying duty cycles to generate the unfiltered current pulses and alternate the direction of the coil current pulses through the coil.

13. The magnetic flowmeter of claim 12, wherein:
the first frequency is 10-100 kHz; and
the second frequency is 5-200 Hz.

14. The magnetic flowmeter of claim 13, wherein:
the EMF sensor comprises first and second electrodes positioned on opposing sides of the fluid flow, each of the first and second electrodes configured to sense a voltage of the fluid flow; and
the magnetic flowmeter includes:
a signal processor configured to receive the voltages sensed by the first and second electrodes and generate a digital voltage signal indicating a voltage difference between the first and second electrodes that is proportional to the EMF and the flow rate of the fluid flow; and
a digital processor configured to process the digital voltage signal and establish a flow rate of the fluid flow.

15. The magnetic flowmeter of claim 14, including a communications interface configured to communicate the flow rate to an external computing device over a two-wire process control loop that powers the magnetic flowmeter.

16. A method of controlling a magnetic flowmeter comprising:
receiving the fluid flow through a pipe section of a flow tube assembly having a coil;
generating unfiltered current pulses at a first frequency using a power amplifier spaced apart from the flow tube assembly and connected to the coil by a transmission line, each unfiltered current pulse generated within a pulse period that corresponds to the first frequency;
attenuating the unfiltered current pulses using a low pass filter of the power amplifier to form coil current pulses at a second frequency that form a coil current, wherein the coil current pulses include remnant signals of the unfiltered current pulses;
driving the coil current pulses through the coil of the flow tube assembly in alternating directions, the coil current inducing a standing wave in the transmission line due to an impedance mismatch;
generating a magnetic field across the fluid flow and inducing an electromotive force (EMF) in the fluid flow that is proportional to the flow rate in response to driving the coil current pulses through the coil;
sampling a coil current pulse at a sampling point within each pulse period using a current sampling circuit, wherein a relationship between the sampling points and the remnant signals of the unfiltered current pulses is unique for each sampling point to reduce measurement errors due to the standing wave; and
adjusting the coil current based on the current pulse samples using a controller.

17. The method of claim 16, wherein:
the sampling point for each sample is positioned at a sampling delay from the beginning of each pulse period; and
the method comprises adjusting the sampling delay for each sample using the controller.

18. The method of claim 17, wherein adjusting the sampling delay for each sample comprises randomizing the sampling delay for each sample using the controller.

19. The method of claim 17, wherein adjusting the sampling delay for each sample comprises shifting the sampling delay for each sample using the controller.

20. The method of claim 17, wherein:
the unfiltered current pulses are generated after a pulse delay from the beginning of each pulse period;
the sampling point for each sample is positioned at a fixed sampling delay from the beginning of each pulse period; and
the method comprises adjusting the pulse delay for each current pulse using the controller.

* * * * *